(12) United States Patent
Hills et al.

(10) Patent No.: US 6,239,797 B1
(45) Date of Patent: *May 29, 2001

(54) METHOD AND APPARATUS FOR REMOTE DATABASE RECORD SCROLL/UPDATE WITHOUT REFRESH

(75) Inventors: Eric Bryan Hills; Darrell Lee Fuller, both of Austin, TX (US)

(73) Assignee: Partnerware Technologies, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,040

(22) Filed: Apr. 2, 1998

(51) Int. Cl.[7] .................................................. G09G 5/00
(52) U.S. Cl. .................. 345/340; 709/219; 709/217; 709/203; 345/123; 345/134; 707/509
(58) Field of Search ................................. 707/402, 509, 707/10; 345/341, 342, 123, 124, 347, 580, 334, 340; 709/219, 217, 203

(56) References Cited

U.S. PATENT DOCUMENTS

| | | | |
|---|---|---|---|
| 5,721,908 | * | 2/1998 | Legarde et al. .......................... 707/10 |
| 5,805,159 | * | 9/1998 | Bertram et al. ........................ 707/507 |
| 5,835,712 | * | 11/1998 | Dufresne ............................... 709/203 |
| 5,867,665 | * | 2/1999 | Butmsn et al. ......................... 709/239 |
| 5,884,312 | * | 3/1999 | Dustan et al. .......................... 707/10 |
| 5,913,028 | * | 6/1999 | Wang et al. ........................... 709/203 |
| 5,913,214 | * | 6/1999 | Madnick ................................. 707/10 |
| 6,023,701 | * | 2/2000 | Malik et al. ............................ 707/10 |
| 6,032,182 | * | 2/2000 | Mullen-Schultz ..................... 709/223 |
| 6,034,683 | * | 3/2000 | Mansour et al. ...................... 345/339 |

OTHER PUBLICATIONS

Peter Kent, "Using Netscape 3: The Fast and Easy Way to Learn", Que, ch. 3–4, and ch. 19, 1996.*

* cited by examiner

Primary Examiner—Raymond J. Bayerl
Assistant Examiner—Thomas J Joseph
(74) Attorney, Agent, or Firm—Gray Cary Ware & Freidenrich, LLP

(57) ABSTRACT

A method for database record scroll/update without refresh is provided that can be implemented in a scroll/update control application 16. An association with a database is maintained. Requests are serviced from a web browser client application that wishes to access the data in the database. The client application is instructed to maintain a visible display frame for displaying the data. The client application is instructed to maintain a hidden scroll frame such that data received from the database is placed into the scroll frame and then populated into the visible display frame without refreshing the display frame. The client application is instructed to maintain a hidden update frame such that data intended to update the database is populated from the display frame into the update frame and then sent to the database without refreshing the display frame.

6 Claims, 2 Drawing Sheets

METHOD AND APPARATUS FOR REMOTE DATABASE RECORD SCROLL/UPDATE WITHOUT REFRESH

TECHNICAL FIELD OF THE INVENTION

The present invention relates generally to the area of computer database communications and more specifically to a method and apparatus for database record scroll/update without refresh.

BACKGROUND OF THE INVENTION

Remote network computing is becoming increasingly important in database applications. Users desire to maintain databases of information on one computer while allowing users at several remote sites to obtain access to and update the data in the database.

One method of granting such access to varied remote users through the use of the Internet or an intranet. First, the database is maintained on some storage platform through the use of any of several commercially available database software packages. Then, the database is made available on the Internet or an intranet through a web server. Remote users can then use commercially available web browsers to access the database, for example by using browsers operable to interpret hyper text markup language (HTML). Such a system can require several layers of communication. A user using a web browser communicates over the Internet to the web server. The web server in turn processes the communication through a web applications server. The web application server then directs the request to a scroll/update control application (or "control applications") which in turn accesses the data on the database.

The control application processes the user's request, accesses the database, and then sends required information back to the user via the web applications server, web server, and the Internet or an intranet.

Each layer of protocol increases the amount of time required to service a user request. The more data sent via the Internet increases the communication time for the request.

The web browser incurs an additional time penalty. The user's web browser interprets information sent by the control application and creates a view on the user's computer monitor. Each time the web browser receives a package of data, it may need to redraw (or "refresh") the screen visible to the user. Thus, in addition to the communication time, the user must also wait for a delay caused by the refreshing time.

SUMMARY OF THE INVENTION

In accordance with the present invention, a method and apparatus for database record scroll/update without refresh is provided that reduces disadvantages and problems with previously developed systems.

A control application maintains an association with a database and services requests from a web-browser client application to access the data. The control application instructs the client to maintain a visible display frame in the browser for displaying data to a user. The control application further instructs the client browser to maintain a hidden scroll frame such that data received from the database is placed into the scroll frame and then populated into the display frame without refreshing the entire display frame that is visible to the user. The application further instructs the client browser to maintain a hidden update frame such that data intended to update the database is populated from the display frame into the update frame and then sent to the database without refreshing the entire display frame.

More specifically, the present invention contemplates that the end user is a web browser operable to interpret hypertext markup language (HTML) pages. Further, the database control application can implement the method by packaging data from the database and instructions into HTML pages and JAVASCRIPT. Further embodiments contemplate the situation where the database is stored on a computer that is remote from the end-user and the communication between the database and the end-user takes place through the Internet, intranet, or extranet (any TCP/IP network).

A technical advantage of the present invention is that the database control application sends smaller amounts of data to accomplish its tasks than present systems. If a user desires to scroll through records on the database, the database control application need only send the new data and instructions for the end-user to populate the data into the display frame, without the need to rebuild an entire HTML page. Furthermore, since the data is populated from the hidden scroll frame, the end-user does not need to refresh the screen.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
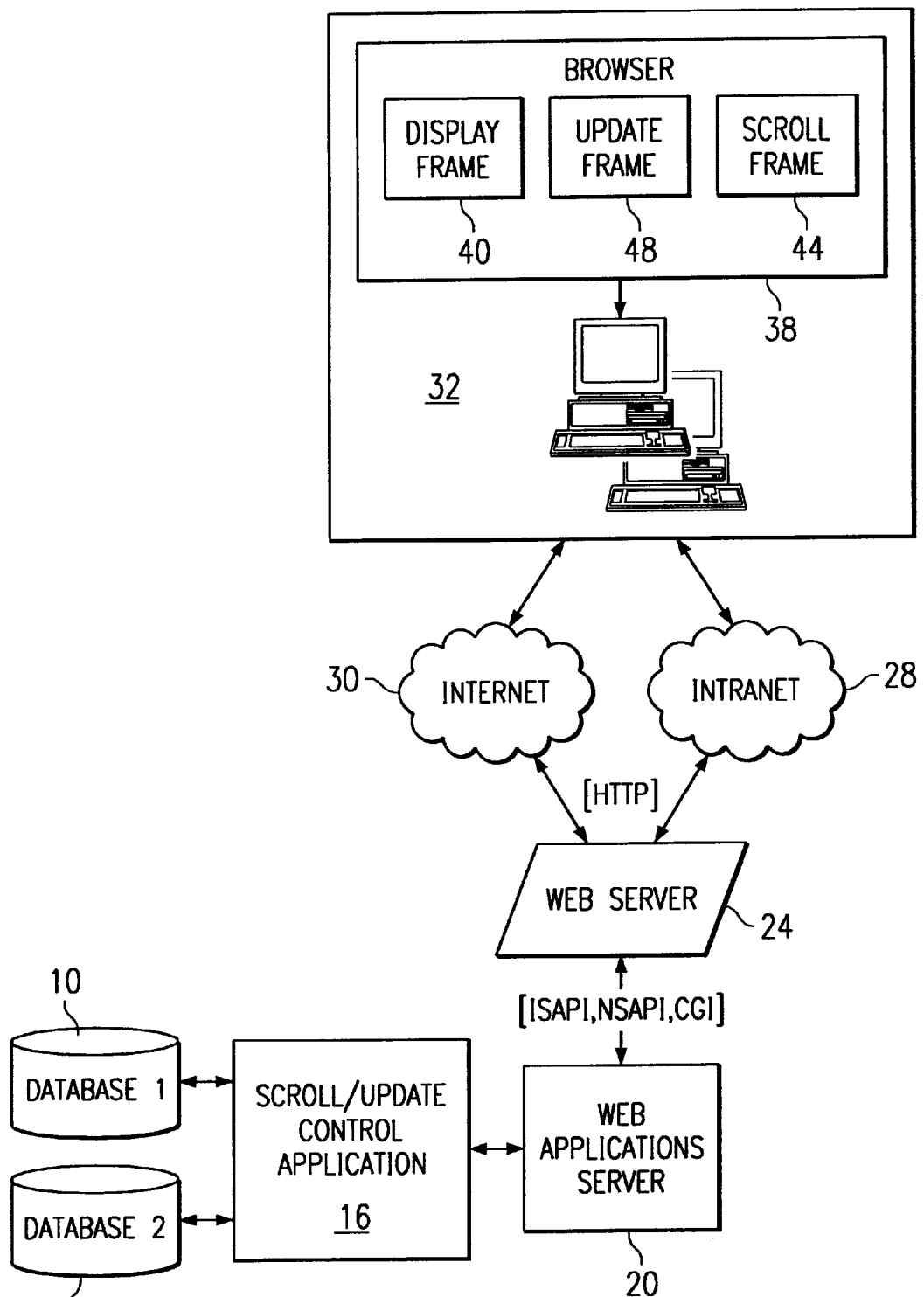
FIG. 1 is a system overview of a computer system implementing a database record scroll/update method according to one embodiment of the present invention.

FIG. 1 is a system overview of a computer system implementing a database record scroll/update method according to one embodiment of the present invention. A first database (DB1) 10 and a second database (DB2) 12 represent databases comprising data accessible by a group of associated users. Associated with DB1 10 and DB2 12 is database control application 16. Scroll/update control application 16 interfaces with web applications server 20 to moderate the flow of data to and from DB1 10 and DB2 12. Web applications server 20 is associated with a web server 24. Web server 24 manages communication and data between web applications server 20 and computers 32 through the Internet 30 or intranet 28. Computer 32 contains browser 38 which, according to one embodiment of the present invention, contains display frame 40, update frame 48, and scroll frame 44.

In operation, computer 32 contains a browser 38 such as NETSCAPE NAVIGATOR, MICROSOFT INTERNET EXPLORER, or other software operable to communicate with web server 24, for example through hyper text transfer protocol (HTTP). In the embodiment shown in FIG. 1, the computer 32 is remote from DB1 10 and DB2 12, meaning browser 38 does not exist on the same computer as DB1 10 and DB2 12. However, a different embodiment places DB1 10 (or a subset thereof) resident on a user's computer 32 along with a personal web server. Web server 24 is operable to route requests and data to and from computer 32. Web server 24 recognizes user requests and then passes the request to web application server 20 through protocols such as ISAPI, NSAPI, and CGI. Web application server 20 operates to process data and communication between web server 24 and DB1 10 and DB2 12. For example, web applications server 20 could comprise software such as NETIMPACT DYNAMO or POWER DYNAMO, both produced by SYBASE. Web applications server 20 routes particular requests for data from DB1 10 and DB2 12 through control application 16. The scroll/update control application 16 comprises instructions built through the use of web application server 20, which is generally known in the art. The control application 16 receives requests for data from web applications server 20, queries DB1 10 or DB2 12 for the correct data, and then packages the data to be sent back to browser 38 through web applications server 20 and web server 24. For example, control application 16 could package the data into hyper text markup language (HTML) pages such that when sent back through the system to browser 38 on computer 32, browser 38 will interpret the HTML pages to display the data to a user.

Although only two databases are shown, control application 16 could control access to any number of such databases. Furthermore, control application 16 could perform tasks such as insuring user on computer 32 has appropriate security level access to view the contents of either database or update the contents of either database. According to one embodiment of the present invention, control application 16 could package the data to be sent through the system to computer 32 such that browser 38 on computer 32 will create three frames: display frame 40, update frame 48, and scroll frame 44.

Figure 2:
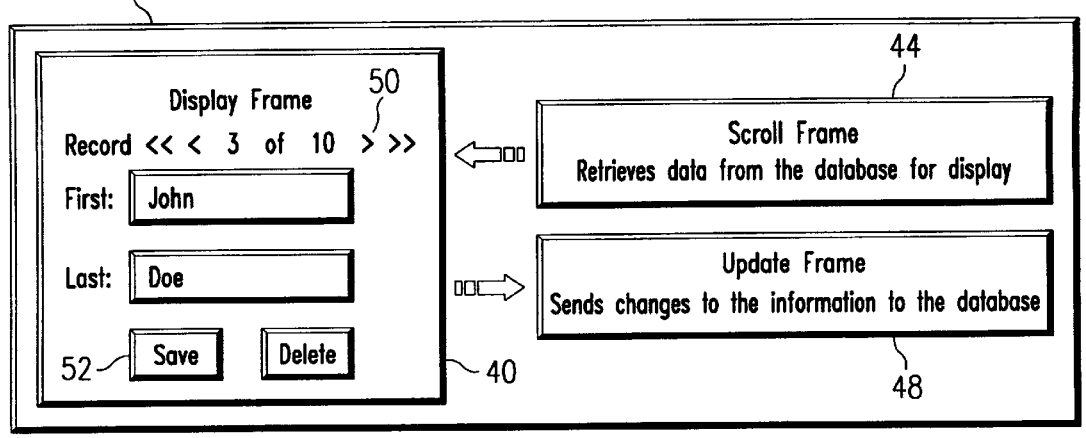
FIG. 2 is a component diagram of the display frame, scroll frame, and update frame according to one embodiment of the present invention.

FIG. 2 is a component diagram of display frame 40, scroll frame 44, and update frame 48 in a web browser according to one embodiment of the present invention. Display frame 40 is the only frame visible to a user. Display frame 40 associates with scroll frame 44 and update frame 48 each of which is hidden from the user. When a user desires to scroll through data on an associated database, the user indicates that fact, for example, by clicking his mouse on arrow 50. Scroll frame 44 retrieves data from the associated database and then populates that data into the appropriate places of the display frame. By first retrieving the data into the hidden scroll frame and then populating the display frame, the invention can allow a user to scroll through data on a remote database without the need to refresh the entire visible display frame. Similarly, if a user desires to update information on the database, the user can indicate by, for example, clicking upon save button 52. The data in the display frame is sent to update frame 48 and it is update frame 48 which forwards the information to the database. By maintaining the update frame hidden from the user, the user may update records in the database without the need to refresh the visible display frame. A technical advantage of such a system is the time saved by eliminating the need to refresh the entire screen visible to the user.

A further technical advantage of the present invention involves the communication time involved in sending data from the control application 16 (FIG. 1) to browser 38. In current applications, control application 16 (FIG. 1) recognizes a request for data, obtains the data from DB1 10 (FIG. 1) or DB2 12 (FIG. 1) and then creates and sends an entire new HTML page with the new data to browser 38. However, with the current invention, control application 16 needs to send only the new data to scroll frame 44, along with instructions for browser 38 to populate the data into portions of display frame 40. Since scroll frame 44 is invisible to the user, the browser 38 does not have to refresh the screen. Furthermore, control application 16 (FIG. 1) can send less data to browser 38, thus cutting the network communication time.

A similar advantage exists for updating records. The user indicates a desire to update data on DB1 10 (FIG. 1), for example by changing data visible to the user and clicking on SAVE button 52 (FIG. 2). Browser 38 takes this data and places it into update frame 48, once again without refreshing the screen visible to user. Browser 38 then sends only the update frame data to control application 16 (FIG. 1), which in turn performs the necessary database functions to update DB1 10 (FIG. 1).

The instructions control application 16 (FIG. 1) sends to browser 38 could comprise only HTML pages and JAVASCRIPT. Alternatively, control application 16 (FIG. 1) could use compiled languages such as JAVA APPLETS or ACTIVE X. However, fewer commercially available browsers have the functionality to interpret compiled instructions in a consistent fashion.

Figure 3:
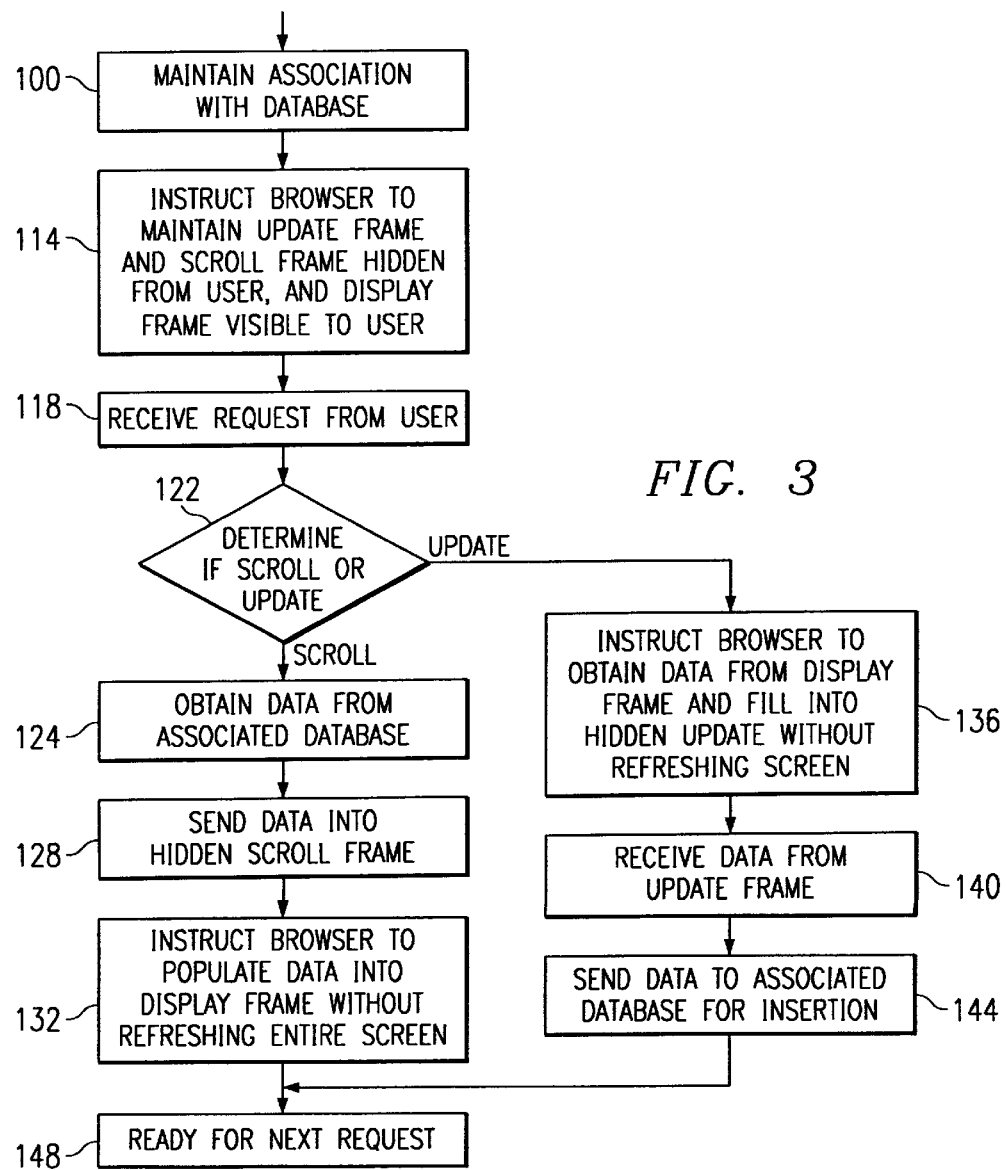
FIG. 3 is a flow diagram of a method of database record scroll/update without refresh according to one embodiment of the present invention.

FIG. 3 is a flow diagram of a method of database record scroll/update without refresh according to one embodiment of the present invention. The method in this embodiment is performed by control application 16 (FIG. 1) (also referred to as "application"). At 100, the application maintains an association with a database. The application is able to control access to the database. At 114, the application instructs browser 31 to build a display frame visible to a user, an update frame hidden from the user, and a scroll frame hidden from the user. In one embodiment, these instructions are built as HTML pages and JAVASCRIPT language. The instructions can also include data from the database that the user wishes to access. At 118, the application receives a request from the user. At 122, the application determines if the request was either a scroll or an update. If the request was a scroll, at 124, the application obtains the appropriate data from the associated database. Then, at 128, the application sends the data into the hidden scroll frame. In one embodiment, the application sends the data as an HTML page with accompanying JAVASCRIPT instructions. The technical advantage of such an embodiment is that an entire new HTML page does not have to be sent to the browser for loading in the display frame. Only the necessary data to change the data contents of the existing display frame as well as instructions need be sent. Moreover, the present invention may be modified to send both the previous and the subsequent data element for the scroll frame of interest. This further enhances the response to the user when subsequently scrolling ahead or back one data record. At 132, per instructions from the application, the user's browser populates the data from the scroll frame into the display frame without refreshing the entire screen.

If the original request was for a data update, then at 136 the browser, per instructions from the application, obtains the data from the display frame, fills the data into the hidden update frame, and sends the data from the update frame at step 140 to the application at step 140. This is accomplished without refreshing the screen visible to the user. At 144, the application receives the data from the update frame. Then at 144, the application performs the appropriate functions to update the database with the new data. Then at 148, the system is ready for another request.

Alternate embodiments may add additional functionality to the application. For example, the application could ensure a appropriate security access of the user prior to sending data to the scroll frame at 128 or updating the database with data from the update frame at 144.

Although the present invention has been described in detail, it should be understood that various changes, substitutions and alterations can be made thereto without departing from the sphere and scope of the invention as defined by the appended claims.

What is claimed is:

1. An HTML method for streamlining browsing and e-commerce transactions, the method comprising:

establishing a link with at least one database;

accessing data stored in the database;

displaying the accessed data in a display frame embedded in an HTML page; and identifying and suppressing refreshing of areas of the HTML page on demand while continually populating the display frame with the accessed data via a hidden scroll frame, wherein the HTML page refreshing is toggled on and off on demand by a user until one of the data has been viewed or a transaction has been concluded, and wherein refreshing and suppressing multiple areas of the HTML page can be selected and implemented on demand while viewing at least one selected display frame in the HTML page.

2. The HTML method according to claim 1, wherein said link with said database is via a TCP/IP network selected from the group of networks consisting of Internet and intranet networks.

3. The HTML method according to claim 2, wherein said at least one database is stored remotely from a computing system operable to display said display frame.

4. The HTML method according to claim 1, wherein said link with said database comprises a local connection.

5. The HTML method according to claim 1, further comprising the step of maintaining security control of said at least one database such that user must have an appropriate security level to access said at least one database.

6. An HTML method for streamlining Internet browsing and e-commerce transactions, the method comprising:

establishing a link with a database via the Internet;

accessing data stored in the database;

displaying the accessed data in a display frame embedded in an HTML page; and identifying and suppressing refreshing of areas of the HTML page on demand while continually populating the display frame with the accessed data via a hidden scroll frame, wherein the HTML page refreshing is toggled on and off on demand by a user until one of the data has been viewed or a transaction has been concluded, and wherein refreshing and suppressing multiple areas of the HTML page can be selected and implemented on demand while viewing at least one selected display frame in the HTML page.

\* \* \* \* \*